(12) United States Patent
Kadokawa et al.

(10) Patent No.: US 7,927,022 B2
(45) Date of Patent: Apr. 19, 2011

(54) THRUST ROLLER BEARING

(75) Inventors: Satoshi Kadokawa, Kanagawa (JP);
Makoto Hinohara, Kanagawa (JP);
Syuuichi Tsubouchi, Kanagawa (JP);
Noriyuki Takeo, Kanagawa (JP);
Makoto Fujinami, Kanagawa (JP)

(73) Assignee: NSK Ltd., Tokyo (JP)

( * ) Notice: Subject to any disclaimer, the term of this patent is extended or adjusted under 35 U.S.C. 154(b) by 144 days.

(21) Appl. No.: 11/910,739

(22) PCT Filed: Apr. 5, 2005

(86) PCT No.: PCT/JP2005/006684
§ 371 (c)(1),
(2), (4) Date: Mar. 21, 2008

(87) PCT Pub. No.: WO2006/109353
PCT Pub. Date: Oct. 19, 2006

(65) Prior Publication Data
US 2009/0016663 A1    Jan. 15, 2009

(51) Int. Cl.
*F16C 19/30* (2006.01)
*F16C 33/46* (2006.01)

(52) U.S. Cl. ........................ 384/618; 384/623

(58) Field of Classification Search ................. 384/618, 384/621, 622, 623; *F16C 19/30, 33/58, 33/46*
See application file for complete search history.

(56) References Cited

U.S. PATENT DOCUMENTS

| | | | |
|---|---|---|---|
| 3,090,109 A | | 5/1963 | White et al. |
| 3,240,543 A | * | 3/1966 | Benson ......................... 384/623 |
| 3,572,862 A | * | 3/1971 | Teramachi ..................... 384/621 |
| 3,994,546 A | * | 11/1976 | Alling ........................... 384/623 |
| 4,077,683 A | * | 3/1978 | Bhateja et al. ................. 384/623 |
| 6,910,948 B2 | | 6/2005 | Yoshiba et al. |
| 2003/0113051 A1 | | 6/2003 | Yoshiba et al. |
| 2005/0185876 A1 | | 8/2005 | Yoshiba et al. |

FOREIGN PATENT DOCUMENTS

| | | |
|---|---|---|
| DE | 1 149 202 A | 5/1963 |
| DE | 1 221 057 A | 7/1966 |
| EP | 1 298 336 A2 | 4/2003 |
| FR | 899 187 A | 5/1945 |
| GB | 913144 A | 12/1962 |
| JP | 49-131435 | 11/1974 |
| JP | 52-50441 | 4/1977 |
| JP | 63-106917 | 7/1988 |

(Continued)

*Primary Examiner* — Thomas R Hannon
*Assistant Examiner* — Phillip A Johnson
(74) *Attorney, Agent, or Firm* — Miles & Stockbridge P.C.

(57) ABSTRACT

Even when used at a high rotation speed, outside parts in relation to the radial direction of a cage 3, of the circumferential parts of a pocket 7 are kept from being worn away by outside end surfaces 21 of rollers 2. Moreover the rollers 2 are kept from sliding on the inside the pockets 7, to thereby stabilize the performance of rotation support parts.

The outside end surface 21 of the roller 2 is made a ball convex surface, so that the center part of the outside end surface 21 can be freely in contact with the inner peripheral surface of a second outside cylindrical portion 14. In a condition with the rollers 2 displaced radially outward of the cage 3 due to centrifugal force, a PV value of a rubbing part between the outside end surface 21 and the opposite surface is kept low, and the wear of this rubbing part is suppressed.

2 Claims, 7 Drawing Sheets

FOREIGN PATENT DOCUMENTS

| | | |
|---|---|---|
| JP | 02-19929 U | 2/1990 |
| JP | 8-109925 A | 4/1996 |
| JP | 52-128862 | 9/1997 |
| JP | 2002-206525 A | 7/2002 |
| JP | 2002-2250346 A | 9/2002 |
| JP | 2003-083333 A | 3/2003 |
| JP | 2003-172346 A | 6/2003 |
| JP | 2004-028342 A | 1/2004 |

* cited by examiner

THRUST ROLLER BEARING

TECHNICAL FIELD

A thrust roller bearing (including a thrust needle bearing) according to the present invention, it is used assembled to a rotation part of a transmission of a vehicle in order to support the thrust load applied to the rotation part.

BACKGROUND ART

The rotation part of a transmission or the like has a thrust roller bearing mounted thereon so as to support the thrust load applied to the rotation part or the like. FIG. 7 shows one example of a thrust roller bearing used for such a rotation part, that is described in Patent Document 1 (Japanese Patent Application Publication No. H 08-109925). This thrust roller bearing 1 is constructed with a plurality of rollers 2 (including needles) arranged in a radial direction, a cage 3 that retains the rollers 2, and a pair of races 4a and 4b that hold a plurality of the rollers 2 from opposite sides. The cage 3 comprises a first cage element 5 and a second cage element 6 each made in an overall annular shape with a C-shape cross section, assembled together with a hollow therebetween, with the same number of pockets 7 as the rollers 2 arranged in a radial pattern as shown in FIG. 8.

The first cage element 5 is made by applying plastic working such as press working to a metal sheet such as a steel sheet or the like, and comprises a first inside cylindrical portion 9 and a first outside cylindrical portion 10 formed concentric with each other on the inner and outer circumferences of a first ring portion 8 thereof. Moreover, first through holes 11 of rectangular shape, being long in the respective radial directions, are provided in a plurality of places around the circumferential direction of the first ring portion 8 for constructing the pockets 7. Furthermore, the second cage element 6 is also made by applying a plastic working process such as press working to a metal sheet such as a steel sheet, and comprises a second inside cylindrical portion 13 and a second outside cylindrical portion 14 formed concentric with each other on the inner and outer circumferences of a second ring portion 12 thereof. Moreover, second through holes 15 of rectangular shape, being long in the respective radial directions, are provided in a plurality of places around the circumferential direction of the second ring portion 12 for constructing the pockets 7. The first cage element 5 and the second cage element 6 each having such constructions, are combined so that the second outside cylindrical portion 14 is fitted into the radial inside of the first outside cylindrical portion 10, and the second inside cylindrical portion 13 is fitted onto the radial outside of the first inside cylindrical portion 9, in a condition with the first through holes 11 and the second through holes 15 matched with each other in relation to the axial direction. Moreover, by folding the tip edge of the first inside cylindrical portion 9 radially outwards, the parts are prevented from separating from each other.

Furthermore, the races 4a and 4b are each made in a ring shape from a metal plate of sufficient hardness. Short cylindrical folded up walls 16a and 16b are respectively formed on the inner circumference edge of the race 4a, which is commonly known as the inner race (left hand in FIG. 7), and the outer circumference edge of the other race 4b, which is commonly known as the outer race (right hand in FIG. 7). Moreover, by folding radially outward a plurality of places on the tip edge of the folded up wall 16a, and by folding radially inward a plurality of places on the tip edge of the folded up wall 16b, locking portions 17a and 17b are formed. The locking portions 17a and 17b, and the inner circumference edge or the outer circumference edge of the cage 3 are engaged with each other so that the component parts of the thrust roller bearing 1 are inseparably joined to each other.

As shown for example in FIG. 7, the thrust roller bearing 1 constructed as described above is mounted onto a rotating part where a thrust load occurs, in a state where the folded up wall 16b formed on the outer circumference of the aforementioned race 4b called an outer race, is fitted into a concave cylinder shaped retaining portion 19 formed in a casing 18. In this state, the right hand surface of the race 4b makes contact with a back surface 19a of the retaining portion 19, and the left hand surface of the other race 4a makes contact with an end surface 20a of an opposite member 20. As a result, the casing 18 rotatably supports the opposite member 20, and the thrust load acting between both members 20 and 18 is thus supported. There is also a case where, the back surface 19a or the end surface 20a serve as a raceway surface, and one or both of the races 4a and 4b are omitted.

During use of the thrust roller bearing 1 described above, a force based on centrifugal force and directed in the radial outward direction of the cage 3, is applied to the rollers 2. Due to this force, of the two axial end surfaces of the rollers 2, the outside end surface 21 on the radial outside of the cage 3 is pressed against outside circumference edge portions 22a and 22b on the radial outside of the cage 3, among the circumference portions of the first and second through holes 11 and 15 that constitute the pockets 7. However, this is not to say that the outside end surface 21 is uniformly pressed against the outside circumference edge portions 22a and 22b. In actuality, the outside end surface 21 is pressed against and is in sliding contact with either one of the outside circumference edge portions 22a, or 22b, depending on manufacturing error or displacement of the cage 3 in the axial direction (right and left direction in FIG. 7).

A face pressure P of the sliding part becomes greater as the operating rotation speed of the thrust roller bearing 1 becomes higher and the centrifugal force becomes greater. Furthermore, since the sliding part is in a position distanced from the central axis of the rollers 2, a sliding velocity V between the outside circumference edge portion 22a (or 22b) and the outside end surface 21 becomes greater to a degree. Accordingly, at the sliding part a PV value being the product of the face pressure P and the sliding velocity V, which is widely known as a parameter indicating an influence on wear, becomes greater. As a result, a concavity 23 due to wear may be formed on the outside circumference edge portion 22a (or 22b) as shown in FIG. 9. If the concavity 23 becomes large, the rollers 2 retained in the pockets 7 can slide into the back side of the first ring portion 8 (or the second ring portion 12) where the concavity 23 is formed, and rotation of the rollers 2 cannot be performed smoothly. At the same time, one side surface of the cage 3 (right hand surface of the first cage element 5, or left hand surface of the second cage element 6 shown in FIG. 7) is pressed against side surface of the race 4a or the race 4b which is the opposite surface, so that the resistance in relation to the relative rotation of the cage 3 with respect to the race 4a or the race 4b becomes greater. As a result, not only is the efficiency of machine equipment such as a transmission having the thrust roller bearing 1 assembled therein reduced, but in extreme cases the machine equipment may also become unable to operate normally due to damage such as seizing.

Wear that causes such disadvantages has become more likely to occur compared to heretofore, with the speeding up of the rotation speed of the rotating parts of a transmission, due to recent improvements in the performance of vehicles.

Moreover, an investigation carried out by the present inventor has discovered that the wear is more likely to occur when the movement amount of the rollers 2 inside the pockets 7 becomes greater. This point is now described with reference to FIG. 10 and FIG. 11. As shown in FIG. 10, the roller 2 retained inside the pocket 7 of the cage 3 constructed from the combination of the first cage element 5 and second cage element 6, is displaced in the axial direction of the cage 3 (left/right direction in FIG. 10 and FIG. 11) inside the pocket 7 by an amount L as shown in FIG. 11. Moreover, this displacement amount L becomes greater when the distance between the rotation contact surface of the roller 2 and the inner peripheral edge of the pocket 7 becomes greater. The displacement amount L is measured by turning the cage 3 through 180 degrees in a condition with the central axis of the cage 3 vertically positioned. In a case taking the right hand surface in FIG. 11 as a reference surface for example, the roller 2 projects from the reference surface by an amount of $\Delta L1$ (projecting amount=$\Delta L1$), when this reference surface is at the bottom, and the roller 2 is retracted from the reference surface by an amount of $\Delta L2$ (retracting amount=$\Delta L2$) when the reference surface is at the top. The displacement amount L equals the sum of the projecting amount $\Delta L1$ and the retracting amount $\Delta L2$ (L=$\Delta L1+\Delta L2$).

Moreover, the result of the experiment carried out by the present inventor revealed that the displacement amount L greatly affects the occurrence of wear. In the thrust roller bearing used for this experiment, the diameter of each roller 2 was 2 mm, the axial length was 4.2 mm, and the pitch circle diameter was 59.465 mm. A thrust roller bearing such as this was rotated for 6 hours at 10200 $min^{-1}$ with a 1455 N thrust load applied, and the temperature of the lubrication oil at 125° C. The results of the experiment carried out under these conditions are shown in FIG. 12. In FIG. 12, the upper line with the reference symbol "♦" denotes the projecting amount $\Delta L1$, and the bottom line with the reference symbol "■" denotes the retracting amount $\Delta L2$. Moreover, of twenty one pockets numbered 1 to 21 to indicate their positions, an amount of wear to cause the roller 2 to slide, occurred in the pocket in position 4 and the pocket in position 20, while such an amount of wear did not occur in the other pockets. Similar experimental results were also obtained for a thrust roller bearing with the diameter of each roller 2 of 3 mm, the length 5.8 mm, and the pitch circle diameter 49.87 mm.

The displacement amount L of the roller 2 (=$\Delta L1+\Delta L2$) was greater in the pockets at positions 4 and 20 than in the other pockets, and this is believed to have caused the wear. That is, a greater displacement amount L leads to a greater likelihood of displacement of the roller 2 inside the pocket 7, and a greater likelihood of so-called skew where the rotation center of the roller 2 and the radial direction of the cage 3 become out of alignment. In the case where such skew does not occur, and the rotation center of the roller 2 matches with the radial direction of the cage 3, the direction of the movement of the roller 2 accompanying the rotation thereof, matches the rotation direction of the cage 3, and there is no component in the radial direction of the cage 3. On the other hand, if skewing occurs, a component in the radial direction of the cage 3 occurs corresponding to the direction of the movement of the roller 2 accompanying the rotation thereof. Moreover, if this radial direction component is directed in the radial outward direction of the cage 3, this adds to the force based on the centrifugal force, so that the face pressure on the sliding part between the outside end surface 21, and the outside circumference edge portions 22a (or 22b) becomes higher, and this is understood to cause the aforementioned wear.

A structure is described in the Patent Document 2 (Japanese Patent Application Publication No. 2003-172346) in which at an outside end portion of the cage, metal plates that constitute a pair of cage elements, are overlapped in the axial central portion of the cage. According to such a structure described in Patent Document 2, sliding of a roller due to the above wear is believed to be prevented. However, in the case of the structure described in Patent Document 2, since the surface area of the outer peripheral surface of the cage is narrow, there is a possibility of the opposite surfaces facing this outer peripheral surface becoming worn due to friction with the outer peripheral surface, thus limiting the places in which it may be used. Moreover, since the portion where the metal plates are overlapped needs to be spot-welded, an increase in manufacturing cost may be expected.

Furthermore, a thrust roller bearing having a cage comprising a single metal plate formed with a corrugated cross sectional shape is described in Patent Document 3 (Japanese Patent Application Publication No. 2002-206525). According to such a structure described in Patent Document 3, the abovementioned sliding of the roller due the wear is also believed to be prevented by appropriately designing the positions for forming the pockets. However, the structure described in Patent Document 3 greatly differs from the intended structure of the invention of the present application. Therefore, a structure that achieves the prevention of wear cannot be obtained using equipment conventionally provided for manufacturing the cage 3 having the structures shown in FIG. 7 and FIG. 10. The same applies to the structure described in Patent Document 2.

[Patent Document 1] Japanese Patent Application Publication No. H08-109925
[Patent Document 2] Japanese Patent Application Publication 2003-172346
[Patent Document 3] Japanese Patent Application Publication 2002-206525

DISCLOSURE OF THE INVENTION

Problem to be Solved by the Invention

In consideration of the circumstances described above, [an object of] the present invention is to achieve a structure that can prevent wear on an inner peripheral edge of pockets provided in a cage having the structure such as shown in FIG. 7 and FIG. 10, using equipment conventionally provided for manufacturing this cage.

Means for Solving the Problem

All of the thrust roller bearings of the present invention comprise: a ring shaped cage provided with rectangular shaped pockets being long in respective radial directions, in a plurality of places around the circumferential direction, and a plurality of rollers rotatably provided in each of these pockets. Moreover, the cage is made with first and second cage elements overlapped in the axial direction of the cage.

The first cage element comprises: a first ring portion provided with rectangular shaped first through holes, being long in respective radial directions in a plurality of places around the circumferential direction, for constructing the aforementioned pockets, a first inside cylindrical portion formed on the inner circumference of the first ring portion, and a first outside cylindrical portion formed on the outer circumference of the first ring portion.

Furthermore, the second cage element comprises: a second ring portion provided with rectangular shaped second through holes, being long in respective radial directions at the same pitch as that of the first through holes in relation to the circumferential direction, for constructing the aforementioned pockets, a second inside cylindrical portion formed on the inner circumference of the second ring portion, and a second outside cylindrical portion formed on the outer circumference of the second ring portion.

Moreover, both the first and second cage elements are combined so that the second outside cylindrical portion is fitted into the radial inside of the first outside cylindrical portion, and the second inside cylindrical portion is fitted onto the radial outside of the first inside cylindrical portion, in a condition with the first through holes and the second through holes matched with each other in relation to the axial direction of the cage.

Particularly, in a thrust roller bearing according to a first aspect of the present invention, of the axial end surfaces of each roller, at least the outside end surface which is on the radial outside of the cage, in a condition in which the roller is fitted into the pocket, is a convex surface in which a center part of said outside end surface projects furthest in the axial direction of each roller. Together with this, the dimension of each part is regulated so that in a condition where the rollers in the pockets are displaced to the outermost side in relation to the radial direction of said cage, the center part of the outside end surface, and the inner peripheral surface of said second outside cylindrical portion are in contact with each other.

Moreover, in the thrust roller bearing according to a second aspect of the present invention, a displacement amount of the rollers inside the pockets in relation to the axial direction of said cage is suppressed to 0.7 mm or less for all rollers in all pockets.

EFFECTS OF THE INVENTION

In the case of the thrust roller bearing of the present invention constructed as described above, rubbing between the outside end surfaces, which of the axial end surfaces of the rollers, are on the radial outside of the cage, and the outside circumference edge portions, which of the circumference edge portions of the first and second through holes constituting the pockets, are on the radial outside of the cage, is prevented, or even if there is rubbing, the PV value of the rubbing parts (sliding parts) can be kept low.

That is, in the case of the first aspect of the present invention, by contacting the center part of the outside end surface of the rollers, and the inner peripheral surface of the second outside cylindrical portion, rubbing between the part that is away from the center of the outside end surface of the rollers, and the outside circumference parts of the first and second through holes can be prevented. Since the sliding velocity at the center part is low, the PV value can be kept low, and wear of the contacting part between the center part of the outside end surface, and the inner peripheral surface of the second outside cylindrical portion can be kept small.

Furthermore, in the second aspect of the present invention, by keeping the displacement amount of the rollers inside the pockets, in relation to the axial direction of said cage low, significant skewing of the rollers can be prevented. As a result, an increase in face pressure of the rubbing parts between the outside end surface of the rollers and the circumference edge portions of the first and second through holes based on the skewing of the rollers is suppressed. As a result, an increase in the PV value of the rubbing parts can be suppressed, and the occurrence of an amount of wear in the circumference edge portions of the through holes to cause the rollers to slide out, can be prevented.

Furthermore, since the present invention can be applied to the above mentioned structures shown in FIG. 7 and FIG. 10, wear prevention on the inner circumference edges of the pockets of the cage can be achieved, using equipment conventionally provided for manufacturing a cage having such a construction.

BEST MODE FOR CARRYING OUT THE INVENTION

When carrying out the present invention, preferably, in addition to the configuration of the first aspect of the invention described above, the axial opposite end surfaces of each roller are ball convex surfaces which have their centers of curvature on the central axes of the respective rollers. Since they have ball convex surfaces, even in the case where the rollers are slightly skewed, an edge load that leads to an increase in face pressure, does not occur at the contacting part between the central portion of the outside end surface and the inner peripheral surface of the second outside cylindrical portion. As a result, the PV value becomes stable and is kept low. Moreover, by forming ball convex surfaces on both axial end surfaces of the respective rollers, it becomes unnecessary to regulate the direction of assembly of the rollers, and a reduction in a cost can be achieved based on a stabilized assembling operation.

Furthermore, preferably, in addition to the configuration of the second aspect described above, the opposite axial end surfaces of the respective rollers are ball convex surfaces as described above, and the dimensions of each part are regulated so that the center part of the outside end surface, and the inner peripheral surface of the second outside cylindrical portion make contact, in a condition where the rollers are displaced in the pockets to the outermost side relative to the radial direction of the cage. According to such a configuration, displacement of the contacting part between the outside end surface of the rollers and the inner peripheral surface of the second outside cylindrical portion, from the rotation axis of the rollers can be kept small. Moreover, the sliding velocity V of the contacting part, and the PV value of the contacting part, can be kept low, wear of the contacting part can be kept low, and rotational resistance of the thrust roller bearing can be kept low.

Furthermore, preferably, by removing a part, being one part of the second outside cylindrical portion, around the circumferential direction, positioned at the outside end part of each pocket, the outside end surfaces of the rollers retained in the pockets are faced to the inner peripheral surface of the first outside cylindrical portion.

Alternatively, by removing a part, being one part of the second inside cylindrical portion around the circumferential direction, positioned at the inside end part of each pocket, the inside end surfaces of the rollers retained in the pockets are faced to the outer peripheral surface of the first inside cylindrical portion.

According to such a construction, the length dimension of the pockets in relation to the radial direction of the cage, and consequently the axial dimension of the rollers retained in the pockets can be lengthened, and an increase in load capacity of the thrust roller bearing can be achieved.

First Embodiment

Figure 1:
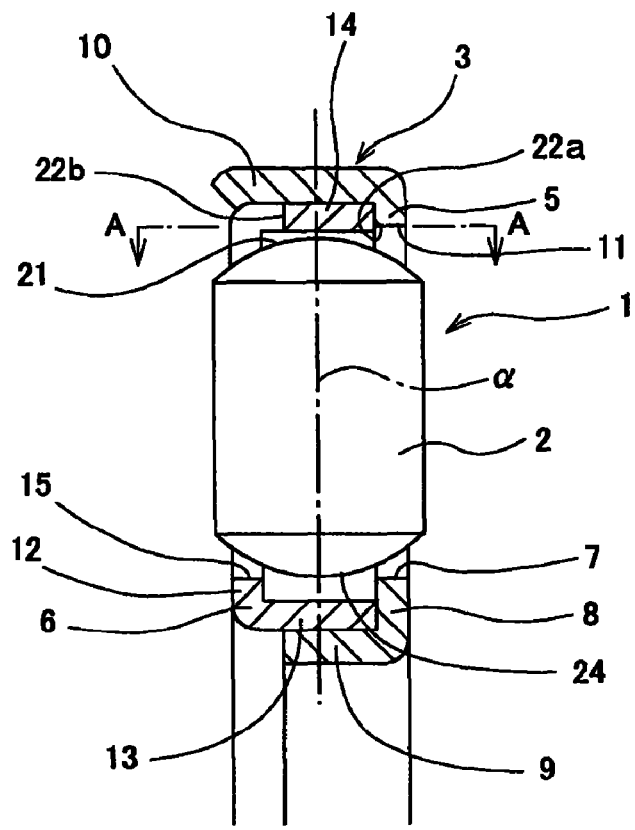
FIG. 1 is a partial sectional view showing a first embodiment of the present invention.
Figure 2:
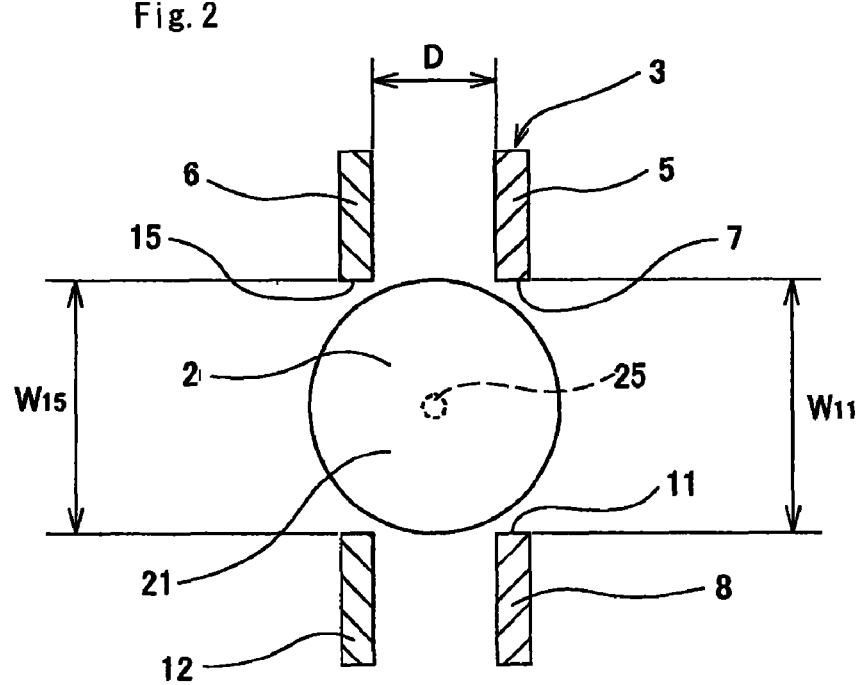
FIG. 2 is a sectional view along the line A-A of FIG. 1.

FIG. 1 and FIG. 2 show a first embodiment of the present invention. A cage 3 that constitutes a thrust roller bearing 1 of the present embodiment comprises a first cage element 5 and a second cage element 6 each made in an overall annular shape with a C-shape cross section, assembled together with a hollow therebetween, with the same number of pockets 7 as the rollers 2 arranged in a radial pattern relative to the center of the cage 3 as shown before in FIG. 8. Moreover, both the outside end surfaces 21 and the inside end surfaces 24 of the rollers 2 relative to the radial direction of the cage 3 respectively have ball convex surfaces, the curvatures of which are centered on a center axis α of each of the rollers 2. Therefore, the center parts of both of the outside end surfaces 21 and the inside end surfaces 24 project the most in the axial direction.

The above first cage element 5 is made by applying plastic working such as press working to a metal sheet such as a steel sheet or stainless steel sheet, and comprises a first inside cylindrical portion 9 and a first outside cylindrical portion 10 formed concentric with each other on the inner and outer circumferences of a first ring portion 8. Moreover, first through holes 11 of rectangular shape, being long in the respective radial directions, are provided in a plurality of places around the circumferential direction of the first ring part 8 for constructing the above pockets 7. Furthermore, the second cage element 6 is also made by applying plastic working such as press working to a metal sheet such as a steel sheet or stainless steel sheet, and comprises a second inside cylindrical portion 13 and a second outside cylindrical portion 14 formed concentric with each other on the inner and outer circumferences of a second ring part 12. Moreover, second through holes 15 of rectangular shape, being long in the respective radial directions, are provided in a plurality of places around the circumferential direction of the second ring part 12, for constructing the pockets 7. The first cage element 5 and the second cage element 6 each having such constructions, are combined so that the second outside cylindrical portion 14 is fitted into the radial inside of the first outside cylindrical portion 10, and the second inside cylindrical portion 13 is fitted onto the radial outside of the first inside cylindrical portion 9, in a condition with the respective first through holes 11 and the respective second through holes 15 matched with each other in the axial direction. Then, by making the engagement condition of the cylindrical portions 13, 14, 9 and 10 as an interference fit, or alternatively by folding the tip edge of the first outside cylindrical portion 10 radially inwards, they are prevented from separating from each other.

Figure 7:
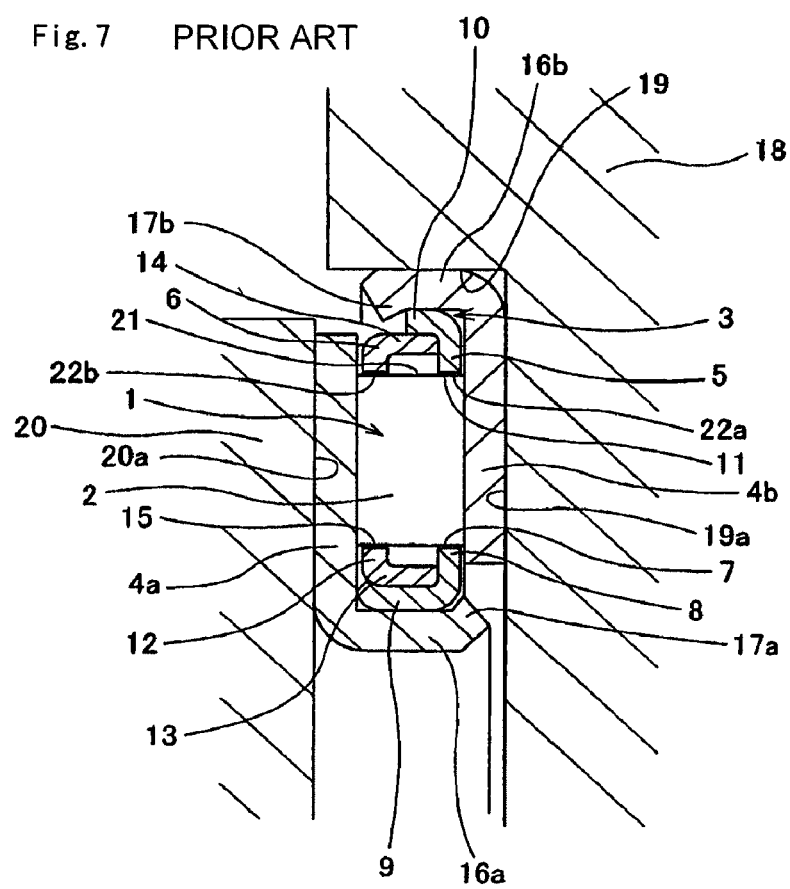
FIG. 7 is a partial sectional view showing one example of a conventional structure assembled on a rotation support part.
Figure 8:
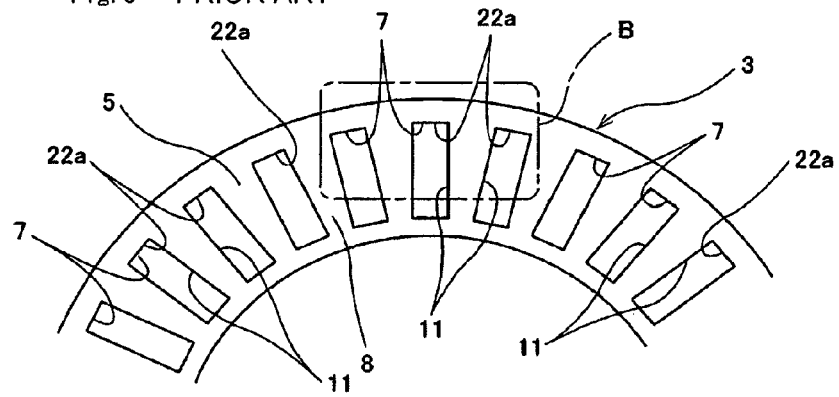
FIG. 8 is a diagram of a removed cage as viewed laterally in FIG. 7.
Figure 9:
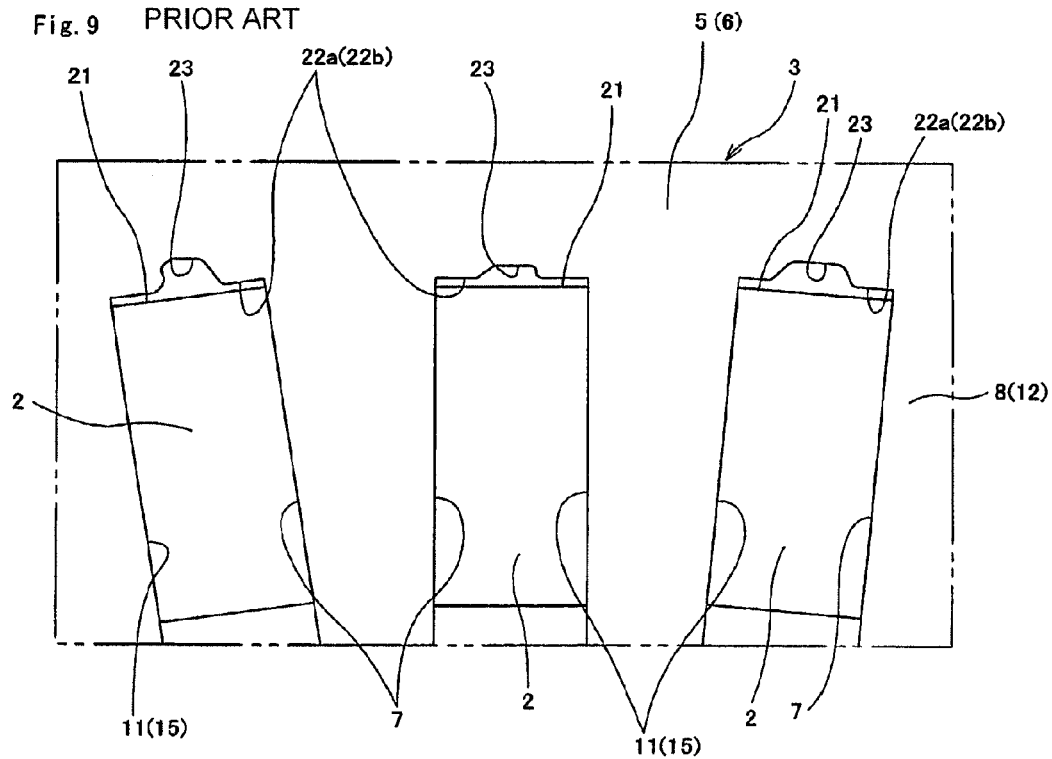
FIG. 9 is an enlarged drawing of part B in FIG. 8 showing one example of wear of the cage caused by a roller.
Figure 10:
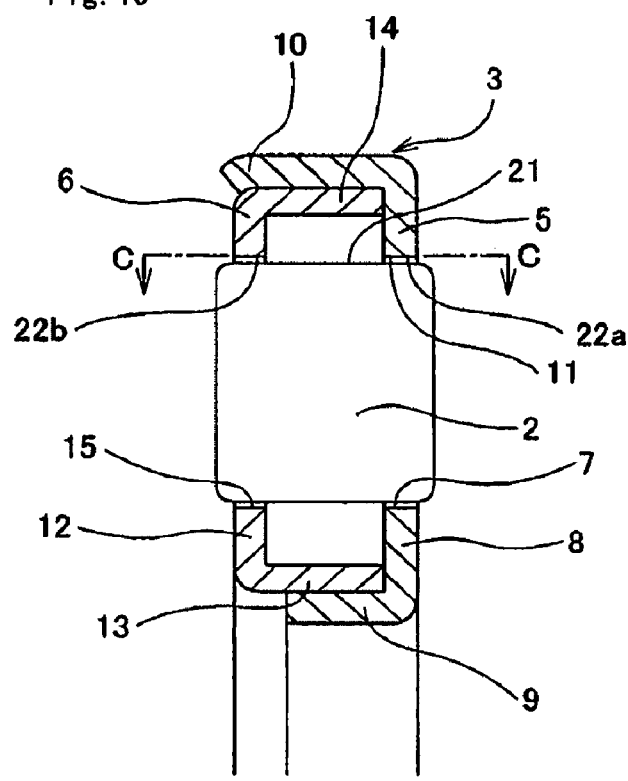
FIG. 10 is a partial sectional diagram of a cage and a roller that constitute a thrust roller bearing, for explaining an experiment carried out in order to investigate the cause of wear of the cage.
Figure 11:
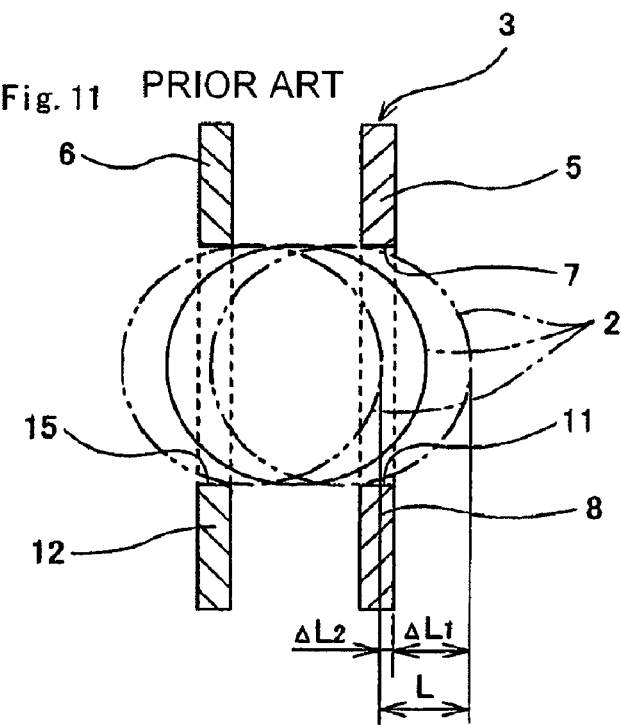
FIG. 11 is a sectional view along the line C-C of FIG. 10.
Figure 12:
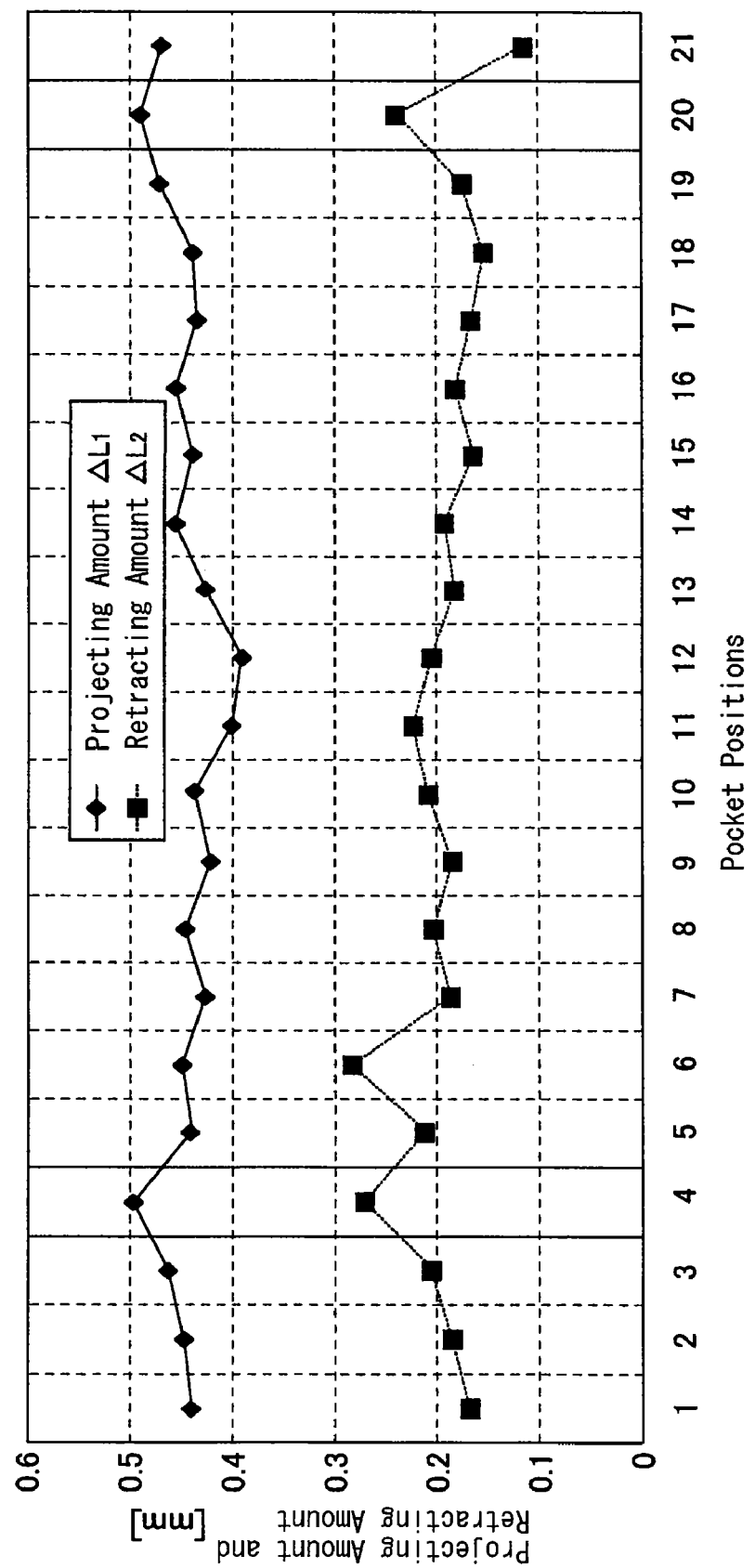
FIG. 12 is a graph showing the experimental results.

In the case of the present embodiment, the first through holes 11 and the second through holes 15 are respectively formed in portions of the first ring part 8 and the second ring part 12 which are more radially outward compared to in the conventional structure described in FIG. 7, FIG. 8, and FIG. 10. As a result, in the case of the present embodiment, the second through holes 15 open to the outer circumference edge of the second ring part 12. Also, in a condition where the rollers 2 retained in the pockets 7 are displaced to the outermost side in relation to the radial direction of the cage 3, the center part of the outside end surface 21, and the inner peripheral surface of the second outside cylindrical portion 14 are contacted with each other. Moreover, by appropriately regulating; a gap D between the first ring part 8 and the second ring part 12, a width W11 of each of the first through holes 11 in relation to the circumferential direction of the cage 3, and similarly a width W15 of each of the second through holes 15, free rolling movement (rotation) of the rollers 2a in the pockets 7 is allowed, and a displacement amount L (=ΔL1+ΔL2, refer to FIG. 11 mentioned above) of the rollers 2a in the pockets 7, in relation to the axial direction of the cage 3, is suppressed to 0.7 mm or less for all rollers 2 in all pockets 7.

In the case of the thrust roller bearing 1 of the present embodiment constructed as described above, rubbing between the outside end surfaces 21 of the rollers 2, and the outside circumference edge portions 22a and 22b, which of the circumference edge portions of the first and second through holes 11 and 15 constituting the pockets 7, are on the radial outside of the cage 3, is prevented, or even if there is rubbing, the PV value of the rubbing parts (sliding parts) can be kept low. That is, by contacting the center part of the outside end surface 21 of the rollers 2, and the inner peripheral surface of the second outside cylindrical portion 14 at a contacting part 25 indicated by the small broken circle in FIG. 2, rubbing between the part of the rollers 2 that is away from the center of the outside end surface 21, and the circumference edge portions of the first through holes 11 and the second through holes 15 is prevented. Since the sliding velocity V at the center part corresponding to the contacting part 25 is low, the PV value can be kept low, and wear of the contacting part between the center part of the outside end surface 21, and the inner peripheral surface of the second outside cylindrical portion 14 can be kept small.

Furthermore, in the case of the present embodiment, since the aforementioned displacement amount L is kept to 0.7 mm or less, the displacement of the rollers 2 in the pockets 7 is suppressed. Moreover, significant skewing of the rollers 2 can be prevented. As a result, even if the outside end surfaces 21, and the outside circumference edge portions 22a and 22b come into proximity to each other, and the outside end surfaces 21 of the rollers 2 and the outside circumference edge portions 22a and 22b rub against each other due to the rollers 2 skewing, the face pressure in this rubbing part can be kept from becoming great. As a result, an increase in the PV value of the rubbing parts can be suppressed, and the occurrence of an amount wear in the circumference edge portions of the through holes 11 and 15 to cause the rollers 2 to slide can be prevented. In this case, it is preferable to employ the structure of a so-called roller-holder in which the position in the axial direction of the cage 3 is constrained at the edge part of the pockets 7 and at the rolling surface of the rollers 2. By employing the roller-holder structure, skewing of the rollers 2 can be effectively prevented. Moreover, in the case where the roller-holder structure is employed, part of the roller 2 projects from both axial end surfaces of the cage 3 at all times. Therefore, ΔL2 in the numerical expression that represents the displacement amount L, becomes a negative value (ΔL2 in FIG. 11 exists on the same side of the reference surface as ΔL1).

Furthermore, in the case of the present embodiment, equipment conventionally provided for manufacturing a cage having the structure such as shown in FIG. 7 and FIG. 10 can be used. Therefore, by carrying out the present embodiment, an increase in manufacturing cost can be suppressed.

If constructed so that the center part of the outside end surface 21 of the rollers 2, and the inner peripheral surface of the second outside cylindrical portion 14 make contact at the contacting part 25, the displacement amount L need not necessarily be kept to 0.7 mm or less. Furthermore, if the displacement amount L is kept to 0.7 mm or less, the center part of the outside end surface 21 of the rollers 2, and the inner peripheral surface of the second outside cylindrical portion 14 need not necessarily contact at the contacting part 25.

Second Embodiment

Figure 3:
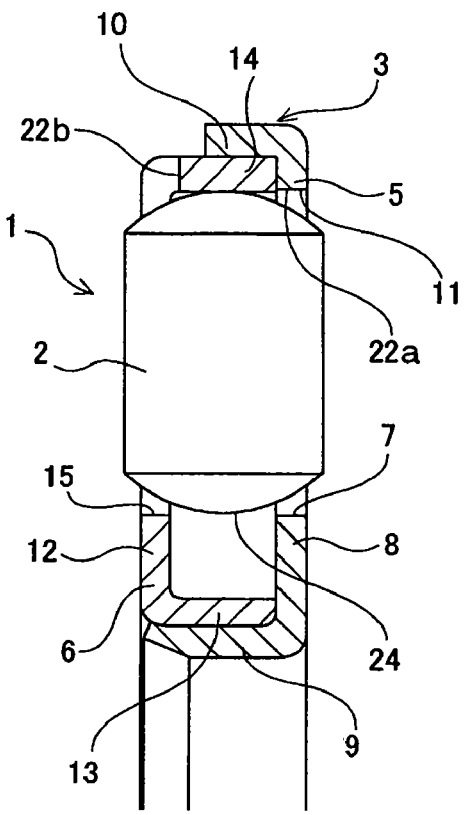
FIG. 3 is a partial sectional view showing a second embodiment of the present invention.

FIG. 3 shows a second embodiment of the present invention. In the case of this embodiment, in order to connect the first cage element 5 and the second cage element 6 that constitute the cage 3 so that they are inseparable, the tip edge of the first inside cylindrical portion 9 is bent radially outwards. The construction and operation of the other parts are similar to for the first embodiment described above.

Third Embodiment

Figure 4:
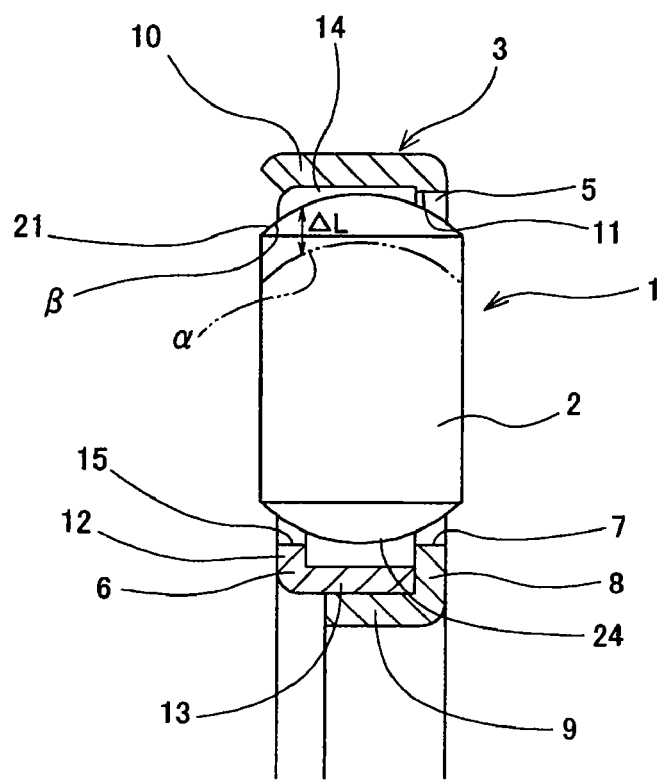
FIG. 4 is a partial sectional view showing a third embodiment of the present invention.
Figure 5:
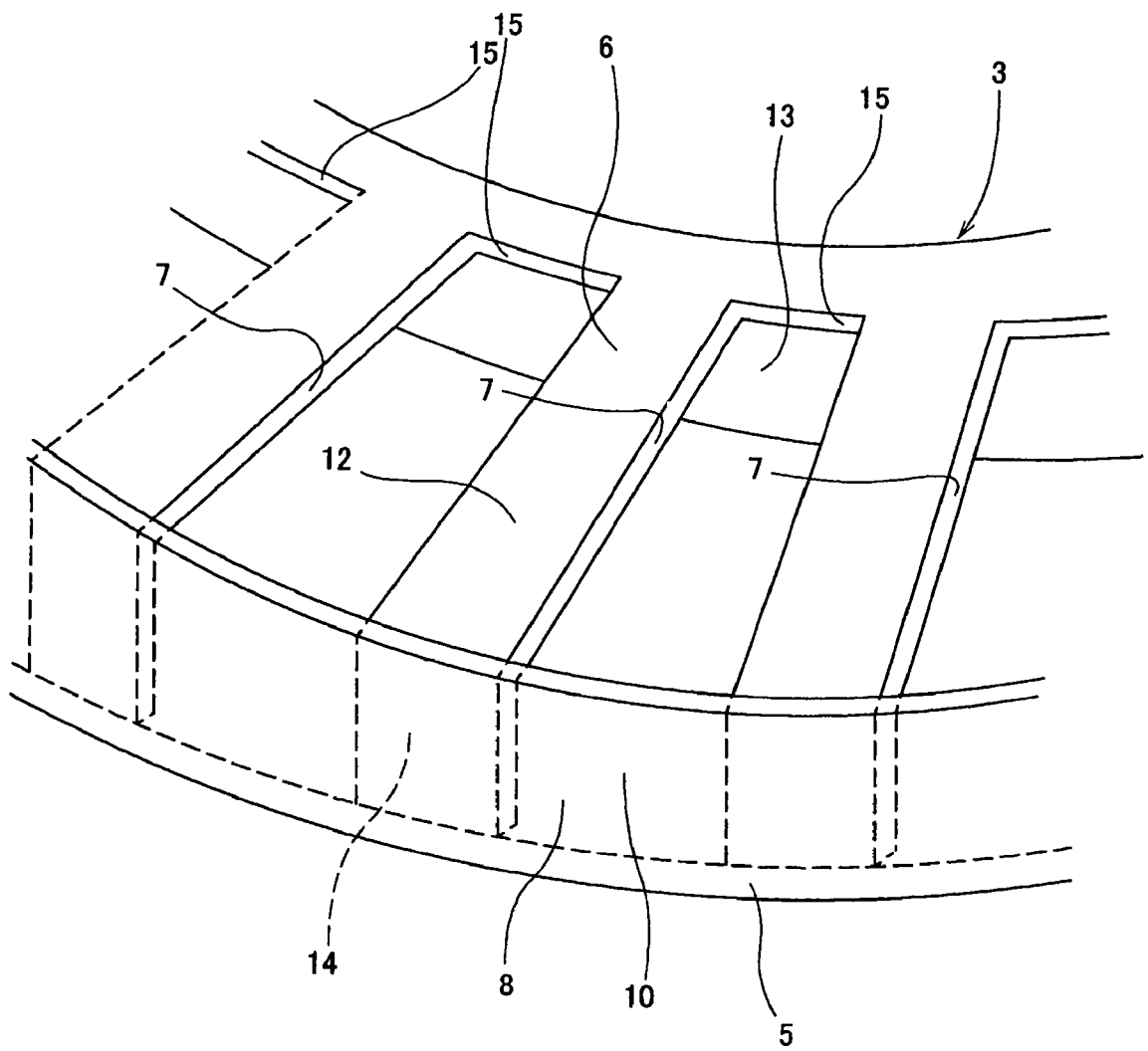
FIG. 5 is a partial perspective view showing a removed cage of the present invention.

FIG. 4 and FIG. 5 show a third embodiment of the present invention. In the case of this embodiment, parts positioned at the outside end portions of the pockets 7 at parts around the circumferential direction, of the second outside cylindrical portion 14 formed on the outside circumference edge portion of the second cage element 6 are removed. Therefore, the second outside cylindrical portion 14 is formed in a notched cylindrical shape in which a wall part and a wall removed part are alternatively repeated. Among these, the wall removed part is positioned at the outside end portion of each of the pockets 7.

According to such a construction, the axial end surfaces (outside end portion in relation to the radial direction of the cage 3) of the rollers 2 retained in the pockets 7 are faced to the inner peripheral surface of the first outside cylindrical portion 10. When the rollers 2 are displaced to the outside end portion in relation to the radial direction of the cage 3, inside the pockets 7, the end surfaces of the rollers 2 contact with the inner peripheral surface of the first outside cylindrical portion 10.

In the case of the present embodiment, by employing a construction such as described above, the length dimension of the pockets 7 in relation to the radial direction of the cage 3, and consequently the axial dimension of the rollers 2 retained inside the respective pockets 7 can be lengthened (by the amount ΔL, the difference between the chain double-dashed line a and the solid line β in FIG. 4, that corresponds to the plate thickness of the second outside cylindrical portion 14), and an increase in the load carrying capacity of the thrust roller bearing can be achieved. Furthermore, in order to prevent interference with the rollers 2, appropriate improvements such as removal of parts, are made to the shape of the first cage element 5. The construction and operation of the other parts are similar to for the first embodiment described above.

Fourth Embodiment

Figure 6:
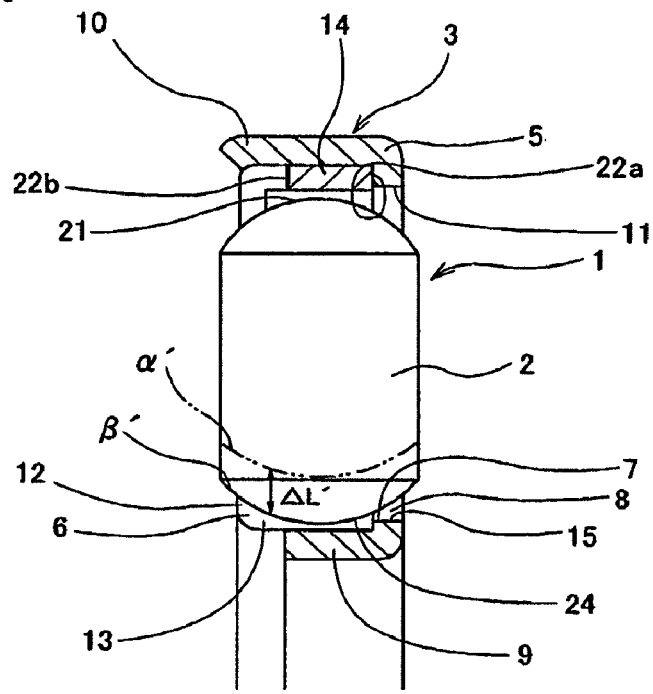
FIG. 6 is a partial sectional view showing a fourth embodiment of the present invention.

FIG. 6 shows a fourth embodiment of the present invention. In the case of this embodiment, parts positioned at the inside end portions of the pockets 7 at the parts around the circumferential direction, of the second inside cylindrical portion 13 formed on the inside circumference edge portion of the second cage element 6 are removed. Therefore, the second inside cylindrical portion 13 is formed in a notched cylindrical shape in which a wall part and a wall removed part are alternatively repeated. Among these, the wall removed part is positioned at the inside end portion of each of the pockets 7.

According to such a construction, the axial end surfaces (inside end portion in relation to the radial direction of the cage 3) of the rollers 2 retained in the pockets 7 is faced to the outer peripheral surface of the first inside cylindrical portion 9. When the rollers 2 are displaced to the inside end portion in relation to the radial direction of the cage 3, inside the pockets 7, the end surfaces of the rollers 2 contact with the outer peripheral surface of the first inside cylindrical portion 9.

In the case of the present embodiment, by employing a construction such as described above, the length dimension of the pockets 7 in relation to the radial direction of the cage 3, and consequently the axial dimension of the rollers 2 retained inside the respective pockets 7 can be lengthened (by the amount ΔL', the difference between the chain double-dashed line α' and the solid line β' in FIG. 6, that corresponds to the plate thickness of the second inside cylindrical portion 13), and an increase in the load carrying capacity of the thrust roller bearing can be achieved. Furthermore, in order to prevent interference with the rollers 2, appropriate improvements such as removal of parts, are made to the shape of the first cage element 5. The construction and operation of the other parts are similar to for the third embodiment described above.

INDUSTRIAL APPLICABILITY

The thrust roller bearing of the present invention is not limited to a rotation support part of a vehicle transmission, and can be applied for example to various kinds of rotation support parts that support a thrust load and rotate at a high speed, such as a rotation support part of a compressor for a car air conditioner.

The invention claimed is:

1. A thrust roller bearing comprising: a ring shaped cage provided with rectangular shaped pockets being long in respective radial directions, in a plurality of places around the circumferential direction, and a plurality of rollers each rotatably provided in a respective pocket, the cage being made with first and second cage elements overlapped in the axial direction, and the first cage element comprising: a first ring portion provided with rectangular shaped first through holes, being long in respective radial directions in a plurality of places around the circumferential direction, for constructing the pockets, a first inside cylindrical portion formed on the inner circumference of the first ring portion, and a first outside cylindrical portion formed on the outer circumference of the first ring portion, and the second cage element comprising: a second ring portion provided with rectangular shaped second through holes, being long in respective radial directions at the same pitch as that of the first though holes in relation to the circumferential direction, for constructing the pockets, a second inside cylindrical portion formed on the inner circumference of the second ring portion, and a second outside cylindrical portion formed on the outer circumference of the second ring portion, and for the first and second cage elements, the second outside cylindrical portion is fitted into the radial inside of the first outside cylindrical portion, and the second inside cylindrical portion is fitted onto the radial outside of the first inside cylindrical portion, in a condition with the first through holes and the second through holes matched with each other in relation to the axial direction, wherein of the axial end surfaces of each roller, at least the outside end surface which is on the radial outside of the cage, in a condition in which the roller is fitted into the pocket, is a convex surface in which a center part of the outside end surface projects furthest in the axial direction, and wherein a part, being one part of the second outside cylindrical portion, around the circumferential direction, positioned at the outside end part of each pocket, is removed, and the surfaces of the axial opposite end surfaces of the rollers retained in the pockets, which become the outside end surfaces on the radial outside of the cage, are faced to the inner peripheral surface of the first outside cylindrical portion, and wherein the dimensions of the cage and the rollers are regulated so that in a condition where the rollers in the pockets are displaced to the outermost side in relation to the radial direction of the cage, the center part of the outside end surface, and the inner peripheral surface of the first outside cylindrical portion are in contact with each other.

2. A thrust roller bearing comprising: a ring shaped cage provided with rectangular shaped pockets being long in respective radial directions, in a plurality of places around the circumferential direction, and a plurality of rollers each rotatably provided in a respective pocket, the cage being made with first and second cage elements overlapped in the axial direction, and the first cage element comprising: a first ring portion provided with rectangular shaped first through holes, being long in respective radial directions in a plurality of places around the circumferential direction, for constructing the pockets, a first inside cylindrical portion formed on the inner circumference of the first ring portion, and a first outside cylindrical portion formed on the outer circumference of the first ring portion, and the second cage element comprising: a second ring portion provided with rectangular shaped second through holes, being long in respective radial directions at the same pitch as that of the first though holes in relation to the circumferential direction, for constructing the pockets, a second inside cylindrical portion formed on the inner circumference of the second ring portion, and a second outside cylindrical portion formed on the outer circumference of the second ring portion, and for the first and second cage elements, the second outside cylindrical portion is fitted into the radial inside of the first outside cylindrical portion, and the second inside cylindrical portion is fitted onto the radial outside of the first inside cylindrical portion, in a condition with the first through holes and the second through holes matched with each other in relation to the axial direction, wherein the axial end surfaces of each roller have a convex surface in which a center part of the respective axial end surfaces projects furthest in the axial direction, and wherein a part, being one part of the second inside cylindrical portion, around the circumferential direction, positioned at the inside end part of each pocket, the surfaces of the axial opposite end surfaces of the rollers retained in the pockets, which become the inside end surfaces on the radial inside of the cage, are faced to the outer peripheral surface of the first inside cylindrical portion, and wherein a dimension of each part is regulated so that in a condition where the rollers in the pockets are displaced to the outermost side in relation to the radial direction of the cage, the center part of the outside end surface, and the inner peripheral surface of the second outside cylindrical portion are in contact with each other.

* * * * *